(No Model.) 2 Sheets—Sheet 1.
O. B. PECK.
CENTRIFUGAL ORE SEPARATOR.
No. 479,955. Patented Aug. 2, 1892.
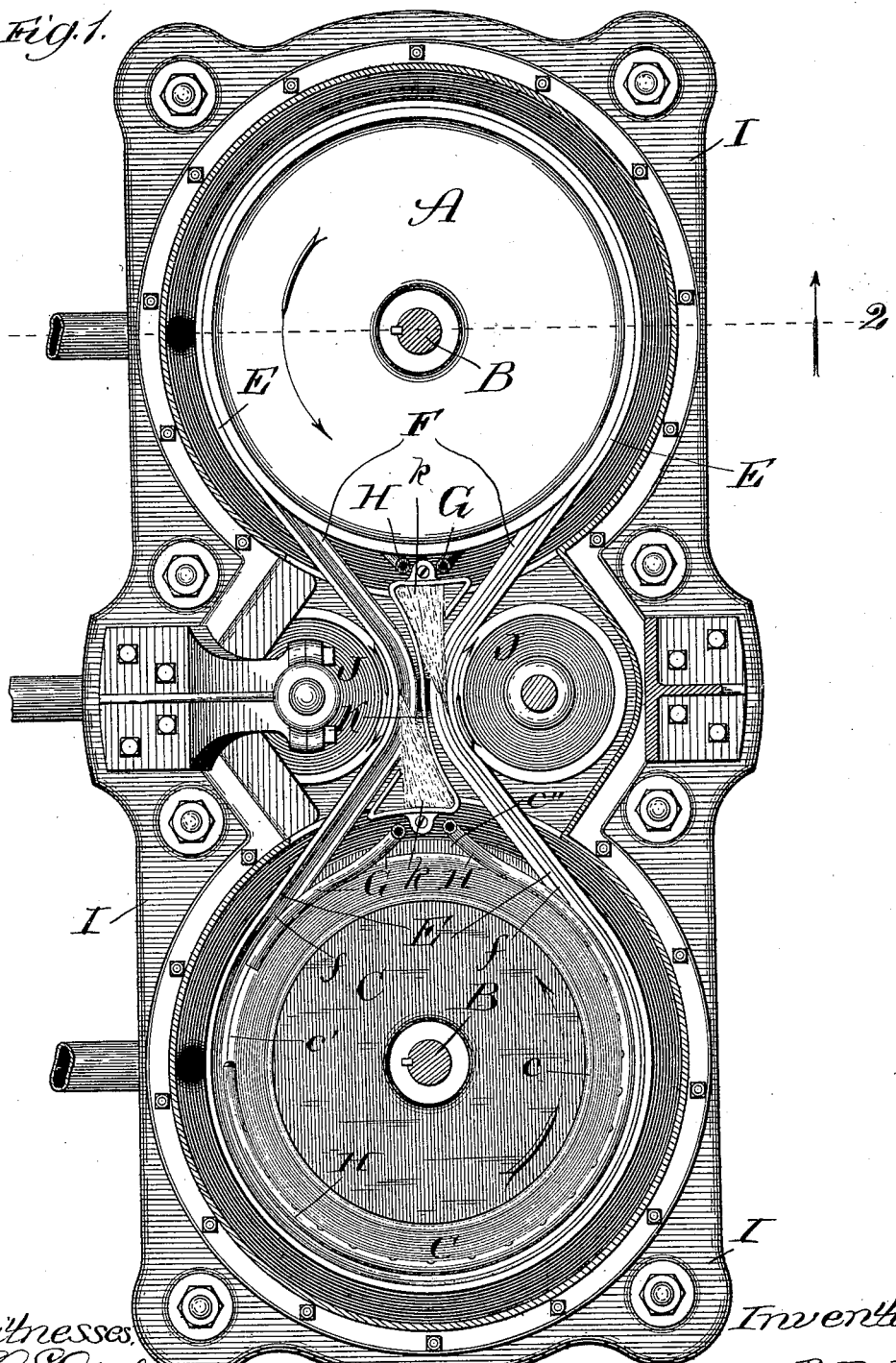
Witnesses
Cas. E. Gaylord,
Clifford A. White.
Inventor,
Orrin B. Peck,
By Banning & Banning & Payson,
Attys.

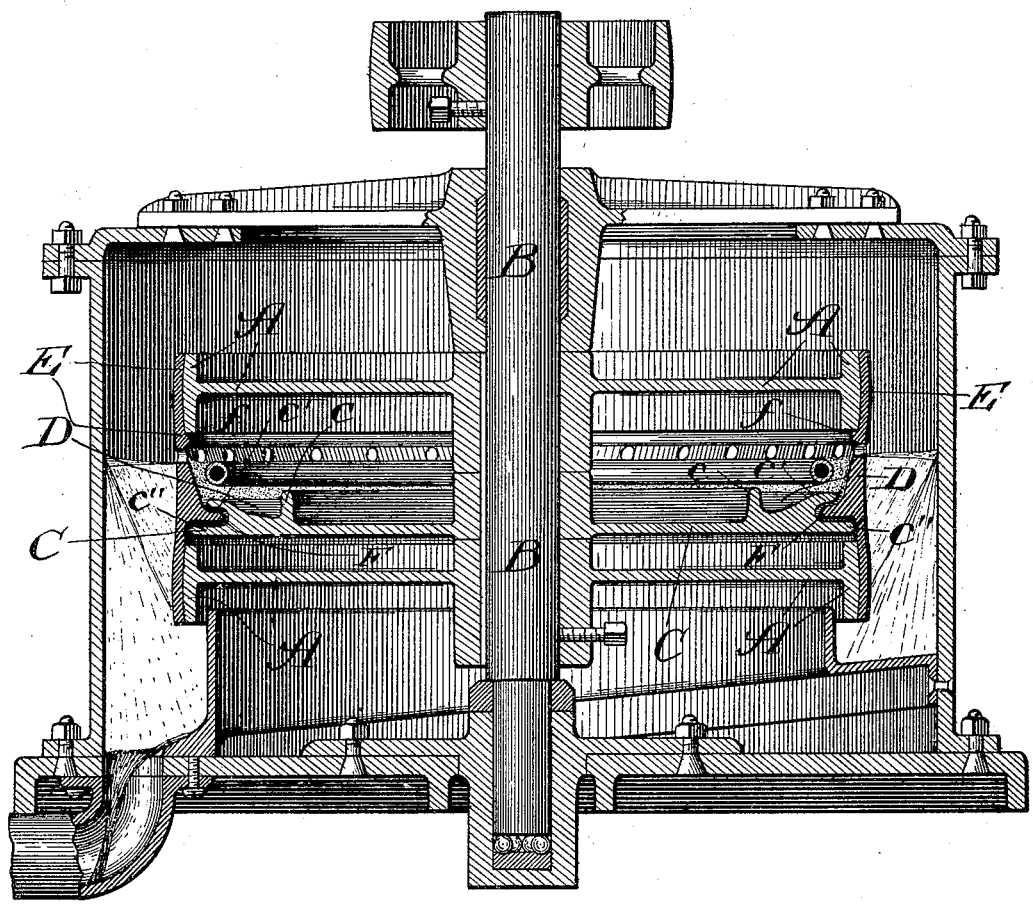

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 479,955, dated August 2, 1892.

Application filed January 11, 1892. Serial No. 417,685. (No model.)

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

In the drawings, Figure 1 is a sectional view of one of the upper pulleys, hereinafter described, removed; and Fig. 2 is a transverse section taken through the line 2 of Fig. 1, looking in the direction of the arrows.

In making my improved apparatus for separating powdered or finely-divided particles containing mineral-bearing substances of different degrees of specific gravity I make pulleys A, preferably of large diameter, mounted on and revolved by a rotatable shaft B, which may be rotated by a pulley at its top or in any other suitable way. Between the pulleys, and mounted on the shaft so as to rotate with it, is a plate or disk C, provided with an upwardly-extending flange $c$ and an outwardly and upwardly extending flange $c'$, forming an annular channel D between them. The outwardly and upwardly extending flange $c'$ forms, with a horizontally-extending flange $c''$, an exterior annular groove around the disk or plate C. A broad belt E passes around the pulleys A, engaging with them in its upper and lower portions and preferably provided on the inner side of its middle portion with an inwardly-projecting rib or flange F, that fits into the annular groove or channel formed between the extending flanges $c'$ and $c''$ of the disk or plate C. Above the upwardly-extending flange $c'$ of the disk the belt is preferably beveled or inclined outwardly, as shown in Fig. 2, to afford a separating-surface for the material to be treated, and a series of holes or perforations are provided for the belt along the upper edge of the separating-surface to permit the material treated to pass out. To prevent the material from passing up above the holes or perforations, I prefer to provide the belt with an inwardly-extending flange or rib $f$ immediately above the holes and below the lower edge of the upper pulley. I arrange a material-supply pipe G and a water-supply pipe H, carried around the interior of the belt near its separating-surface, to gently spray water against such surface. I preferably arrange two sets of pulleys in near juxtaposition to each other, as shown in Fig. 1, and preferably mount them both on the same bed-plate I. Between the sets of pulleys A are preferably arranged idlers J, which bear against the outer surface of the belt between the main pulleys A and bring the sides of the belt close together, so that as the belt passes around the idlers its direction or course is abruptly changed as it spreads out again to encircle the pulleys A. Between the main pulleys and between the idlers is arranged a partition K, provided with pockets $k$, as particularly shown in Fig. 1, adapted to catch the material thrown off from the belts while passing around the idlers. The material as introduced is carried around on the separating-surface of the belt and the lighter particles, with the water sprayed from the pipe H, are driven up by the action of centrifugal force and out through the holes or perforations in the belt, while the heavier particles adhere to the belt and are carried along with it until it is abruptly changed in its course of travel by the idlers, when such particles are thrown off at a tangent and are caught in the pockets $k$, whence they pass down through a hole provided for their escape to the desired place of deposit.

What I regard as new, and desire to secure by Letters Patent in this specification, is—

1. In centrifugal ore-separators, the combination of rotatable pulleys and a belt engaging such pulleys at its upper and lower portions and provided with a separating-surface on its middle portion, substantially as described.

2. In centrifugal ore-separators, the combination of rotatable pulleys and a belt engaging such pulleys at its upper and lower portions and provided with a separating-surface on its middle portion and with one or more inwardly-projecting ribs or flanges, substantially as described.

3. In centrifugal ore-separators, the combination of rotatable pulleys and a belt engaging such pulleys at its upper and lower portions and provided with a separating-surface on its middle portion and holes or perforations along the edge of the separating-surface for the escape of the lighter particles of the material being treated, substantially as described.

ORRIN B. PECK.

Witnesses:
THOMAS A. BANNING,
MARIE L. PRICE.